L. R. SMITH.
KNOTTER.
APPLICATION FILED JUNE 8, 1907. RENEWED FEB. 28, 1908.

903,240.

Patented Nov. 10, 1908.
3 SHEETS—SHEET 1.

Witnesses
Otto E. Hoddick
Dena Nelson

Inventor
Louis R. Smith
By, A. J. O'Brien
Attorney

THE NORRIS PETERS CO., WASHINGTON, D. C.

L. R. SMITH.
KNOTTER.
APPLICATION FILED JUNE 8, 1907. RENEWED FEB. 28, 1908.
903,240.
Patented Nov. 10, 1908.
3 SHEETS—SHEET 2.
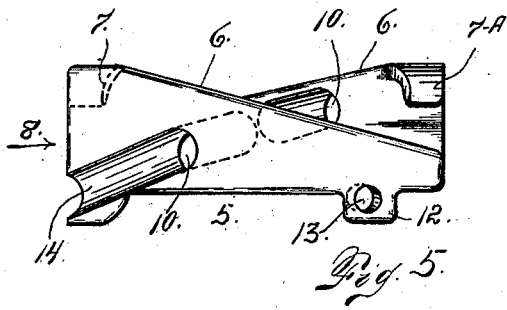
Fig. 5.
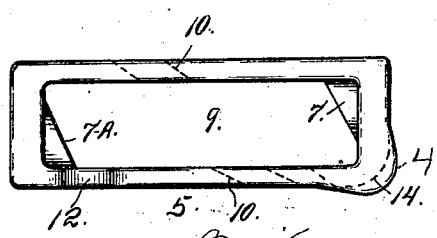
Fig. 6.
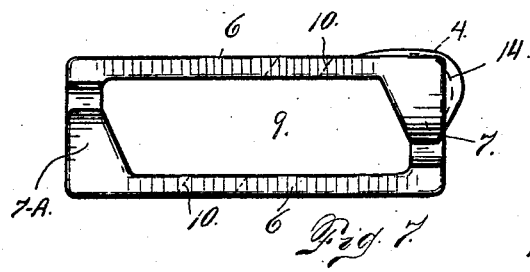
Fig. 7.
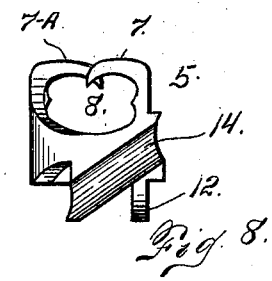
Fig. 8.
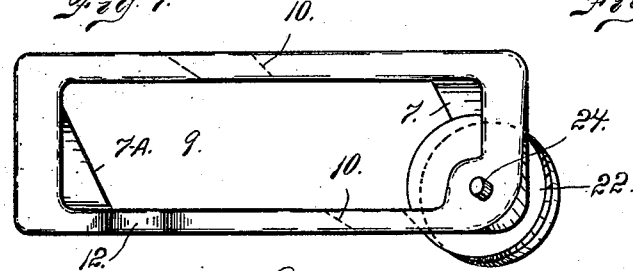
Fig. 9.
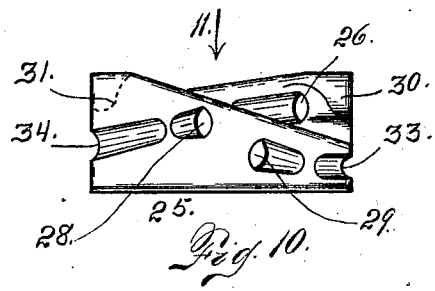
Fig. 10.
Fig. 11.
Witnesses
Otto E. Hoddick.
Dena Nelson.
Inventor
Louis R. Smith.
By
Attorney

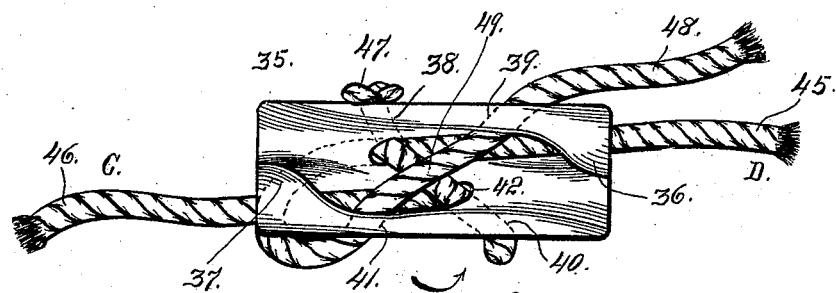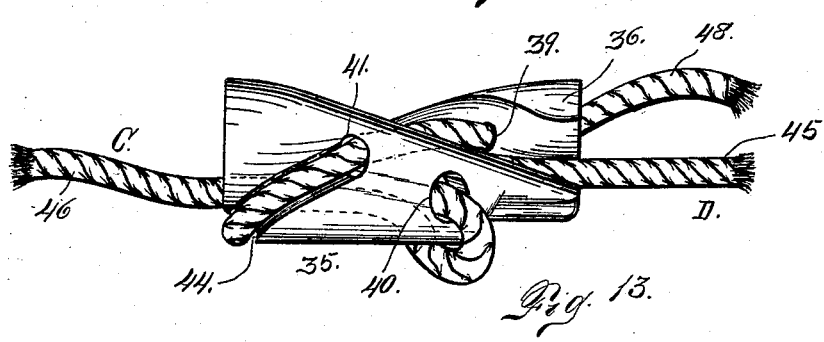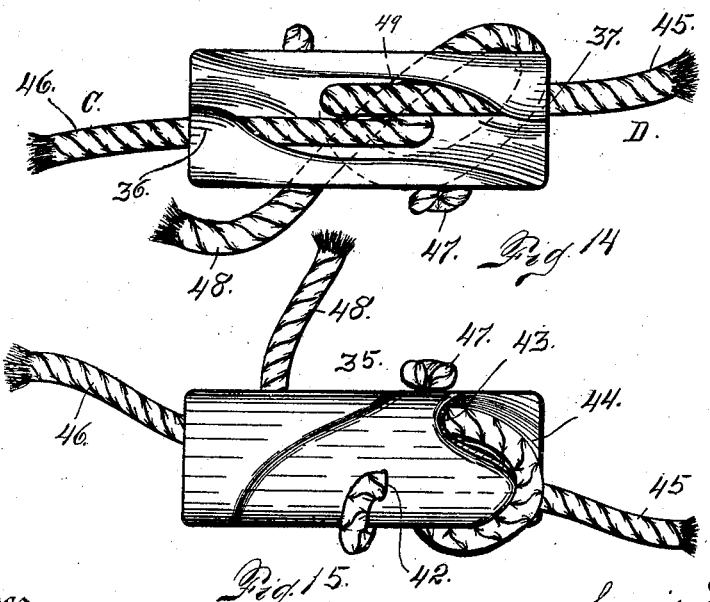

UNITED STATES PATENT OFFICE.

LOUIS R. SMITH, OF COLORADO SPRINGS, COLORADO.

KNOTTER.

No. 903,240.　　　Specification of Letters Patent.　　　Patented Nov. 10, 1908.

Application filed June 8, 1907, Serial No. 377,908. Renewed February 28, 1908. Serial No. 418,291.

*To all whom it may concern:*

Be it known that I, LOUIS R. SMITH, a citizen of the United States, residing at Colorado Springs, in the county of El Paso and State of Colorado, have invented certain new and useful Improvements in Knotters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in knotters and consists of a device adapted for use in fastening ropes or cords.

Where my improved device is used, it is assumed that two flexible members as ropes, cords, wires or other flexible devices are employed. One extremity of each of these members is suitably secured at any desired distance from the knotter. The other extremity of one flexible member is anchored in the knotter, while the other extremity of the secured flexible member is originally connected with the knotter in such a manner as to form a running loop, the free end of this member being brought outwardly for tightening purposes. By pulling upon this free end, the flexible devices may be drawn sufficiently taut for the purpose, after which by giving the knotter a half turn, the two flexible members are securely fastened together and locked in place by overlapping hook-shaped parts with which each extremity of the device is provided.

It is evident that the device may be used in a great many relations. One of its uses is in connection with guy ropes for tents and other structures.

The device may be made in various forms without departing from the spirit of the invention and will now be described in detail reference being made to the accompanying drawing in which is illustrated an embodiment thereof.

Figure 1:
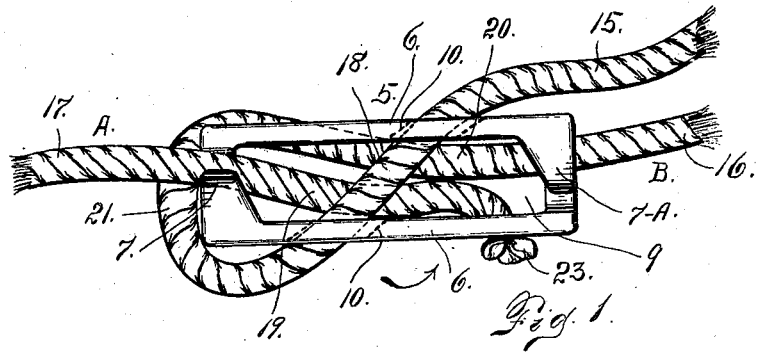
Figure 2:
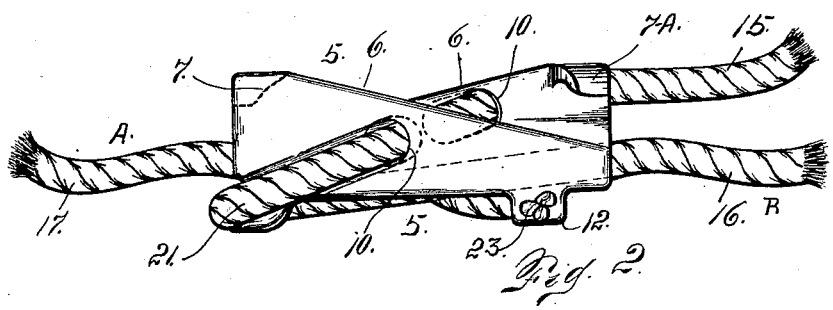
Figure 3:
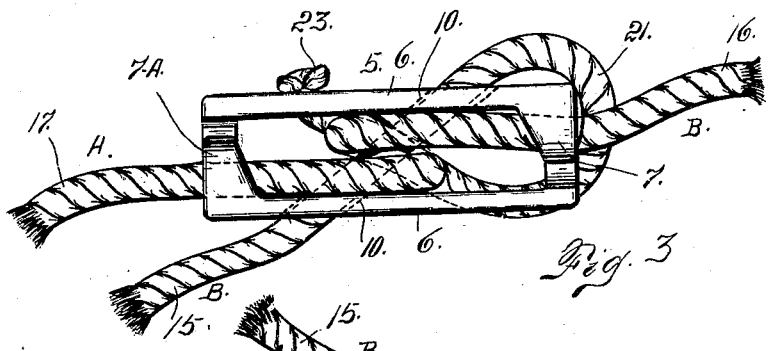
Figure 4:
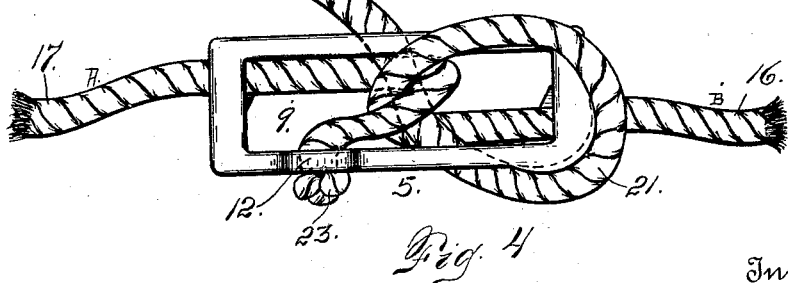

In this drawing, Figure 1 is a top plan view of one form of my improved device shown in connection with the two rope members. When in this position the rope may be drawn taut by pulling upon the laterally protruding rope end. Fig. 2 is a side elevation of the same. Fig. 3 is a top view similar to Fig. 1, but after the device has been given a half revolution in the direction indicated by the arrow in Fig. 1, whereby the rope members are secured or fastened after being drawn taut. Fig. 4 is an underneath view of Fig. 3 or a view showing the device as illustrated in Fig. 3 turned over. Fig. 5 is a side elevation of the device shown in detail or with the rope members detached. Fig. 6 is an underneath view of the same but with the ends reversed, that is to say the extremity at the left in Fig. 5 is at the right in Fig. 6. Fig. 7 is a top view of the device with its extremities located to correspond with Fig. 6 and the reverse of Fig. 5. Fig. 8 is an end elevation of the device looking in the direction of arrow 8 in Fig. 5. Fig. 9 is an underneath view of the device similar to Fig. 6 but showing a modified form of construction, a pulley being journaled at one end to receive one of the rope members and taking the place of a groove or way in the other forms of the device. Fig. 10 is a side elevation of another form of construction, the same being shown in detail and without the flexible cords or members. Fig. 11 is a top plan view of the same or a view looking in the direction of arrow 11 in Fig. 10. Fig. 12 is a top plan view of the device showing another form of construction. Fig. 13 is a side elevation of the same. Fig. 14 is a view similar to Fig. 12 but with the device given a half turn from the position shown in Fig. 12, for the purpose of locking the flexible members in place. Fig. 15 is an underneath view of the device with the flexible members in the position shown in Fig. 14.

The same reference characters indicate the same parts in all the views.

Referring first to Figs. 1 to 8 inclusive, let the numeral 5 designate the knotter in its entirety. This device may be composed of any suitable material as wood, metal, papier-mâché, glass etc. As shown in the views under consideration, the device is formed integral and as seen in top or bottom view (see Figs. 1, 3, 4, 6 and 7) is approximately rectangular in shape. Its sides 6 are downwardly inclined in opposite directions from overhanging hook-shaped parts 7 and 7ᴬ. These parts 7 and 7ᴬ project inwardly from the highest portions of the sides 6. Below these overhanging portions, the device is open at the ends as shown at 8. It is also open at the top and bottom as shown at 9. Its opposite sides are provided with openings 10 indicated by dotted lines in Figs. 6 and 7. These openings are diagonally arranged or so that the rope or cord passed therethrough crosses the open space 9 between the sides 6, in a diagonal direction. The device is provided on one side with a depending lug 12 having an orifice 13 for securing or anchoring one extremity of one of the rope members. In describing the use of the device in connection with the flexible members, I shall designate these members for convenience as ropes or rope members. The term "rope", however, as herein used must be considered of sufficient scope to cover any suitable flexible device. The two rope members I will designate by the reference characters A and B. The rope member A is passed through the orifice 13 from the inside and knotted or upset in any suitable manner as shown at 23 whereby the said extremity is securely held in place. This rope member is then passed lengthwise through the space 9, and carried outwardly through the end opening 8 at the left (see Fig. 1), where it extends underneath the overhanging lip 7. The free end of the member B, still referring to Fig. 1 may be passed through the opposite end of the device under the lip 7$^A$, through the space 9, down through the bottom of this space and around the opposite end of the device as shown at 21, the said end being reinforced for the purpose as shown at 4 and provided with a groove 14 which the rope engages, after which it is passed through the openings 10 in the opposite sides of the device, crossing the space 9 in a diagonal direction from one opening to the other and passing above the rope portions 19 and 20 of the members A and B, respectively, within the space 9 as shown at 18 and carried outwardly on one side of the device as shown at 15. This extremity 15 of the flexible device B may be considered the free end of the rope but it must be understood that the extremity 16 of the rope B and the extremity 17 of the rope A when suitably extended, are attached or anchored.

Now in using the device, the operator will first pull upon the free end 15 which when the parts are in the position shown in Fig. 1, will slide or run freely through the device. This operation should be continued until the rope members A and B are drawn sufficiently taut. As soon as this occurs the device is given a half turn in the direction indicated by the arrow in Fig. 1, changing its position as well as that of the rope members to that shown in Fig. 3. During this operation, the extremity 16 of the rope member B, is removed from the overhanging lip 7$^A$ at one end of the device, passed over the diagonal part 18 of the rope B forming a loop around the same, and passed under the lip 7 at the opposite end of the device (see Fig. 3); while the extremity 17 of the rope member A is also disengaged from the lip 7, passed over the part 18 of the rope B in the opposite direction forming a loop around the same and passed under the lip 7$^A$. This act brings the parts into the relative position shown in top view in Fig. 3 and in underneath view in Fig. 4. By means of this operation the rope members are securely locked against movement in the device, since the members A and B are taut and are looped around the diagonal part 18 of the member B in both directions.

In the form of construction shown in Fig. 9, one extremity of the device is provided with a pulley 22 journaled therein as shown at 24. This pulley takes the place of the groove or way 14 in the forms of the construction heretofore described.

Referring now to Figs. 10 and 11, let the numeral 25 designate the device in its entirety. This device is similar in construction to that shown in Figs. 1 to 8 inclusive. It is, however, provided with two openings 26 and 27 on one side and two openings 28 and 29 on the opposite side. It is also grooved at its opposite ends as shown at 33 and 34 and provided with lips 30 and 31 which are substantially the same as the lips 7 and 7$^A$ in the other forms of construction. In describing the manner of attaching the cord to this form of the device, I will refer more particularly to Fig. 11. One extremity thereof may be passed through the opening 27 from the inside and upset on the outside to prevent its pulling through. The device may then be passed diagonally through the space 32, through the opening 29, around one corner of the device engaging the groove 33, down underneath, and up through the space 32 being finally passed underneath the lip 31; while the other member, may be threaded first through the opening 26 from the outside, thence diagonally through the space 32, thence through the opening 28, thence around one corner of the device through the groove 34, and thence down entering the opening 32 at the bottom, and passing toward the right (see Fig. 11) and carried underneath the lip 30. When in this position, the two cord or rope members may be locked against moving in the device by giving it a half turn in the same manner as the other form of construction. As the rope or cord members are fully shown in Figs. 1 to 4 inclusive, it is not deemed necessary to show them in connection with this form of the device.

Referring now to the form of construction shown in Figs. 12 to 15 inclusive, let the numeral 35 designate the device in its entirety. This device is provided with overhanging lips 36 and 37 at its opposite extremities, the said lips projecting in opposite directions. It is also open at both ends underneath these lips. It is provided with openings 38 and 39 in one side and openings 40 and 41 in the opposite side. It is, however, closed at the bottom except for two openings designated 42 and 43 and indicated in Fig. 15 which is an underneath view as heretofore explained. The device is also provided with a groove or way 44 at one end.

Now in describing the manner of attaching the rope members to the device, I will designate the two rope members in their entirety as C and D. Let 45 designate the extremity of the member D which is secured; and 46 the extremity of the member C which is secured. Now in applying the member C of the device, it may be said to be passed underneath the lip 37 at one end of the device, thence down through the opening 42 in the bottom of the device, thence up through the opening 40 in one side of the device, thence across the space between the two sides of the device, thence through the diagonally located opening 38 on the opposite side where it is knotted or upset as shown at 47 securely anchoring this extremity against movement. The free extremity of the member D may then be passed under the lip 36, thence toward the left through the space between the sides of the device, thence down through the opening 43 in the bottom of the device and thence around the end thereof engaging the groove 44, thence through the opening 41 in one side of the device, and thence diagonally through the central space of the device and through the opening 39, leaving the free extremity 48. Now by pulling upon this free extremity, the two rope members may be drawn taut, after which the device is given a half turn in the direction indicated by the arrow in Fig. 12. When this is done the two rope parts 45 and 46 are looped around the diagonally located part 49 of the rope member D, in opposite directions (see Fig. 14), and passed under the lips 37 and 36, respectively, whereby the rope members are locked securely in place against movement.

Having thus described my invention, what I claim is:

1. A knotter, consisting of a hollow block open at the top and ends and having an end bearing and openings in its opposite sides, the said block being open at the bottom to allow a flexible device to pass upwardly therethrough after passing through the side openings and around the end bearing, the said block also having lips overhanging the end openings and being further provided with means for anchoring a second flexible member.

2. A knotter comprising a hollow block having openings in its opposite sides, an end bearing, and being open at the bottom to allow a flexible device to pass upwardly therethrough after passing through the side openings and around the end bearing, the block also being open at one end to allow the said flexible device to pass out of the block whereby a running loop is formed, means for anchoring a second flexible device in the block whose opposite end is open to allow the last named flexible device to pass therethrough, the block having overhanging end lips, substantially as described.

3. A knotter, consisting of a hollow block having passages to allow a flexible device to be threaded therethrough to form a running loop and fashioned to anchor another flexible device, the said block being open at the ends and having overhanging end lips.

4. A knotter, comprising a hollow block having passages to allow the flexible device to be threaded therethrough to form a running loop and fashioned to anchor another flexible device, the said block being open at the ends to form passages for the flexible devices, the said passages being open at the sides to allow the ready escape and entrance of the flexible devices as the block is given a half turn, substantially as described.

5. A device of the class described, comprising a hollow block having passages to allow a flexible device to be threaded therethrough to form a running loop, provision being made for anchoring a second flexible device, the block being provided with end openings forming passages for the flexible devices, and lips overhanging said passages and projecting in opposite directions, the said passages having lateral openings to permit the ready escape and entrance of the flexible members as the block is given a half turn, substantially as described.

6. A knotter comprising a hollow block having passages to allow a flexible device to be threaded therethrough to form a running loop, the block being provided with means for anchoring another flexible device, the block having end openings forming passages for the two flexible devices, and provided with end lips overhanging the said passages, the latter, however, being open to permit the two flexible devices to exchange positions as the block is given a half turn, substantially as described.

7. A knotter comprising a hollow block having openings and passages to permit the threading of a flexible member therethrough to form a running loop and fashioned to anchor a second flexible device, both of the flexible devices passing through the hollow of the block, the said block having end openings and overhanging retaining lips forming passages for the flexible devices, the said passages having openings to allow the flexible members to exchange positions in the end pasages as the device is given a half turn, substantially as described.

8. A knotter comprising a hollow block having openings to permit a flexible device to be threaded therethrough to form a running loop, and provided with means for anchoring another flexible device, the block having end openings through one of which the last named flexible device passes and through the other of which one branch of the flexible loop passes, the said block having end lips overhanging the flexible members, the said loop projecting in opposite directions, the end passages below the lips being open to allow the flexible members to exchange places as the block is given a half turn, substantially as described.

9. A knotter consisting of a hollow block having passages to allow a flexible device to be threaded therethrough to form a running loop and fashioned to anchor another flexible device, the block being provided with means for securing the running loop against movement when the block is given a half turn.

In testimony whereof I affix my signature in presence of two witnesses.

LOUIS R. SMITH.

Witnesses:
 DENA NELSON,
 A. J. O'BRIEN.